United States Patent
Biebaut et al.

(10) Patent No.: US 8,252,222 B2
(45) Date of Patent: Aug. 28, 2012

(54) MOULD AND PROCESS FOR SHAPING A SULPHUR CEMENT PRODUCT

(75) Inventors: Gary Jozef Alma Biebaut, Louvain-la-Neuve (BE); Jochem Okke Boer, Amsterdam (NL); Luc Glas, Louvain-la-Neuve (BE); Margreet Mauer, Amsterdam (NL); Luuk Van Rees, Enschede (NL); Guy Iode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 303 days.

(21) Appl. No.: 12/523,250

(22) PCT Filed: Jan. 15, 2008

(86) PCT No.: PCT/EP2008/050363
§ 371 (c)(1), (2), (4) Date: Feb. 1, 2010

(87) PCT Pub. No.: WO2008/087124
PCT Pub. Date: Jul. 24, 2008

(65) Prior Publication Data
US 2010/0140837 A1 Jun. 10, 2010

(30) Foreign Application Priority Data
Jan. 15, 2007 (EP) .................................. 07100558

(51) Int. Cl.
*B28B 7/42* (2006.01)

(52) U.S. Cl. ........................................ 264/333; 106/627
(58) Field of Classification Search .................. 106/627; 264/333
See application file for complete search history.

(56) References Cited

U.S. PATENT DOCUMENTS

| | | | | |
|---|---|---|---|---|
| 4,031,684 A | * | 6/1977 | Shibata | 52/612 |
| 4,256,499 A | | 3/1981 | Terrel | 106/70 |
| 4,496,511 A | * | 1/1985 | Virgili | 264/225 |
| 4,981,740 A | * | 1/1991 | Larsen | 428/34.4 |
| 5,678,234 A | * | 10/1997 | Colombo et al. | 588/318 |

FOREIGN PATENT DOCUMENTS

| | | |
|---|---|---|
| CA | 2267860 | 9/2000 |
| DE | 3740682 | 6/1989 |
| FR | 2773340 | 7/1999 |
| WO | WO2006013589 | 2/2006 |

OTHER PUBLICATIONS

Osswald, Tim, "Polymer Processing Fundamentals", 1998, Hanser, Table 1.*

* cited by examiner

*Primary Examiner* — Galen Hauth
(74) *Attorney, Agent, or Firm* — Charles W. Stewart

(57) ABSTRACT

The present invention provides a mold for shaping a sulphur cement product, which mold has an inner surface describing an inner volume for receiving a cast material, an outer surface and a barrier comprised between the inner surface and the outer surface, which barrier has a thermal conductance per unit area of at most 100 W/m²K in a direction perpendicular to the inner surface. The invention further provides a process for shaping a sulphur cement product.

19 Claims, 1 Drawing Sheet

Sample 1

Sample 2

Sample A#

Sample B# not according to the invention

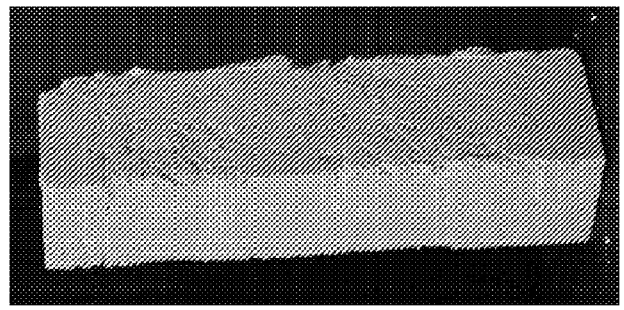
Sample B#
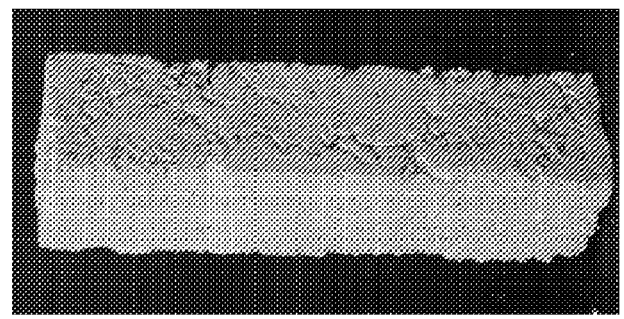
Sample A#
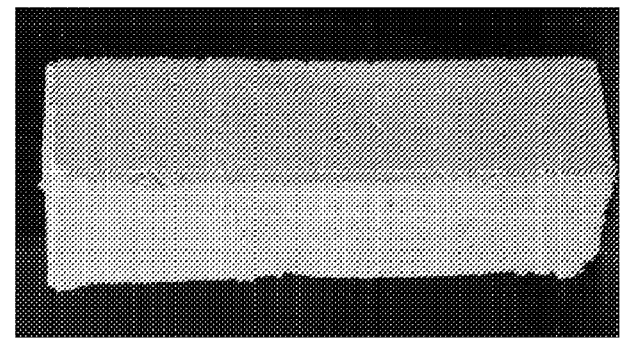
Sample 2
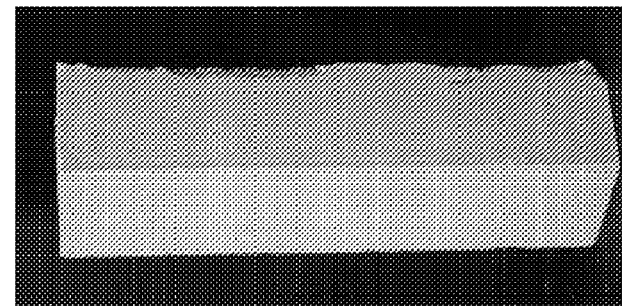
Sample 1
\# not according to the invention

MOULD AND PROCESS FOR SHAPING A SULPHUR CEMENT PRODUCT

The present application claims priority from European Patent Application 07100558.1 filed 15 Jan. 2007.

FIELD OF THE INVENTION

This invention relates to a mould for shaping a sulphur cement product and a process for shaping a sulphur cement product using such mould.

BACKGROUND OF THE INVENTION

Sulphur may be used as an alternative for Portland cement as binder material in construction materials. Sulphur based construction materials, such as sulphur cement and sulphur concrete have distinctive advantages over their Portland cement based counterparts. Sulphur based construction materials are strong, acid and salt resistant and thus applicable in many fields of industry including those where contact with aggressive environments is anticipated. Typical fields of application include building blocks, bricks, tiles, floors, coatings, foundations, acid reservoirs, etc.

Sulphur cement is a thermoplastic material that typically melts at temperatures in the range of from 115 to 125° C., depending on its exact composition. Upon cooling, the liquid sulphur cement re-solidifies at temperatures below the melting temperature.

The ability to melt and subsequently re-solidify allows for the convenient shaping of sulphur cement. A typical process for shaping sulphur cement is moulding.

In CA2267860 is disclosed a process for preparing sulphur comprising concrete blocks, wherein a mixture of powdered sulphur and sand having temperature of 110° C. (230° F.) are moulded and compressed in a urethane mould.

FR2773340 discloses a process for preparing concrete elements using a mould. The mould is formed out of a deformable, flexible plastic material such as polyurethane, silicone or others. FR2773340 does not disclose the dimensions of the mould or its use at elevated temperatures. According to FR2773340, the obtained concrete elements show surface defects and irregularities similar to traditionally produced elements.

Moulded sulphur cement or concrete based structures can suffer a deterioration of compression and flexural strength due to the intrusion of water, as for instance shown in U.S. Pat. No. 4,256,499. Water intrusion occurs due a bad surface finish, which results in the presence of micro cracks and porosity on the outer surface of the structure. As a consequence, the compression strength of the sulphur cement or concrete structures decreases.

In U.S. Pat. No. 4,256,499 is disclosed a method of producing a shaped sulphur concrete article with a good surface finish. In the method of U.S. Pat. No. 4,256,499, adhesion to the mould is prevented by removing the mould prior to melting the sulphur. In the method of U.S. Pat. No. 4,256,499, a mouldable mixture comprising a mineral binding agent and a sulphur component is compressed in a steel mould under high pressure. The thus formed compressed shaped body of the mixture is removed from the mould and subsequently heated to a temperature sufficient to melt the sulphur and cooled to obtain a shaped article. The obtained articles showed post-production water intrusion, exhibiting a reduction in compression strength up to 20% after being soaked in water of 25° C. for 1 hour. The method of U.S. Pat. No. 4,256,499 requires the formation of a self-supporting compressed shaped body prior to melting the sulphur. Furthermore the method of U.S. Pat. No. 4,256,499 requires that the mould be removed prior to melting the sulphur.

In U.S. Pat. No. 4,981,740 is disclosed a method for producing sulphur concrete pipes using casting moulds. To prevent sticking of the sulphur concrete to the mould, U.S. Pat. No. 4,981,740 suggests to preheat the mould and to apply a release agent, i.e. form oil or a polytetrafluoroethylene (PTFE or Teflon™) coating on the surface of casting mould. Applicants have found that sulphur based objects moulded by the process of U.S. Pat. No. 4,981,740 have a rough surface.

There is a need in the art for a mould and an improved process for producing shaped objects of sulphur cement and/or sulphur concrete with a good surface finish, i.e. a smooth surface.

SUMMARY OF THE INVENTION

It has now been found that shaped objects of a sulphur cement product with a good surface finish, i.e. a smooth surface, can be obtained by using a mould having a low thermal conductance per unit area.

Accordingly, the present invention provides a mould for shaping a sulphur cement product, which mould has an inner surface describing an inner volume for receiving a cast material, an outer surface and a barrier comprised between the inner surface and the outer surface, which barrier has a thermal conductance per unit area of at most 100 W/m²K in a direction perpendicular to the inner surface.

Reference herein to a sulphur cement product is to sulphur cement or to a sulphur cement containing material, i.e. to a material at least containing elemental sulphur and a filler. Examples of sulphur cement containing materials are sulphur cement premix compositions and sulphur cement-aggregate composites such as sulphur mortar, sulphur concrete or sulphur-extended asphalt.

Reference herein to thermal conductance per unit area is to the quantity of heat that passes in unit time through unit area of a barrier of particular thickness when its opposite faces differ in temperature by one degree. The thermal conductance per unit area is expressed in W/m²K.

Reference herein to a direction perpendicular to the inner surface is to a direction perpendicular to the tangent plane of the inner surface. It will be appreciated that if the inner surface is curved, the tangent plane may differ depending of the position on the inner surface.

Not being bound to any theory, applicants believe that the formation of a rough surface and of micro cracks and porosity on the outer surface of shaped objects of a sulphur cement product is the result of inhomogeneous temperature profile in the sulphur cement product during cooling. The temperature profile in the sulphur cement product may be influenced by the heat properties of the mould. It has now been found that homogeneity of the temperature profile in the sulphur cement product during cooling can be improved by using a mould having a thermal conductance per unit area of at most 100 W/m²K in a direction perpendicular to the inner surface. The mould according to the invention has the advantage that the rate of heat transfer from the molten sulphur cement product to the mould at the interface between the sulphur cement product and the inner surface of the mould is regulated. If the rate of heat transfer is too high, the interfacial temperature decreases faster than the bulk temperature of the sulphur cement product. When the interfacial temperature decreases below the re-solidification temperature, the sulphur cement product at the interface may become solid while the bulk of the sulphur cement product remains liquid. As a consequence, rough structures, micro cracks and porosity may evolve at the interface induced by internal stresses and material shrinkage.

In another aspect, the invention provides a process for shaping a sulphur cement product comprising cooling a molten sulphur cement product in a mould having an inner surface in contact with the molten sulphur cement product to obtain a shaped solid sulphur cement product and wherein at most 100 W/m²K is diffused per unit area through the mould in a direction perpendicular to the inner surface.

The process according to the invention has the advantage that shaped objects of sulphur cement product may be prepared with a surface that is smooth and essentially free of micro cracks and surface porosity.

BRIEF DESCRIPTION OF THE DRAWINGS

FIG. 1 displays sulphur cement products.

DETAILED DESCRIPTION OF THE INVENTION

The mould of the present invention has an inner surface and an outer surface. The inner surface describes an inner volume set to receive a cast material, typically a sulphur cement product. A barrier is comprised between the inner and the outer surface of the mould. The barrier has a thermal conductance per unit area of at most 100 W/m²K, preferably in the range of from 0.1 to 100 W/m²K, more preferably 0.1 to 60 W/m²K, even more preferably in the range of from 0.1 to 10 W/m²K, still more preferably of from 0.1 to 5 W/m²K, in a direction perpendicular to the inner surface.

Among others, the barrier provides a heat contact between the volume described by the inner surface and an outer atmosphere surrounding the outer surface. In case, the temperature in the inner volume differs from the temperature of the outer atmosphere, heat may be transported through the barrier. As mentioned herein above where the use of the mould for shaping a sulphur cement product is described, it may be desired to regulate the transfer of heat from the interface of the mould and the inner volume to the outer atmosphere. The rate at which heat is transported through the barrier, i.e. the thermal conductance per unit area of the barrier, depends on the thermal properties of the material(s) of which the barrier is comprised and the thickness of the barrier in a direction perpendicular to the inner surface. The correlation between the thermal conductance per unit area and the thickness of the barrier is given by the thermal conductivity in a direction perpendicular to the inner surface of the material(s) of which the barrier is comprised. Reference herein to the thermal conductivity is to the quantity of heat transmitted, due to unit temperature gradient, in unit time under steady conditions in a direction normal to a surface of unit area, when the heat transfer is dependent only on the temperature gradient. The thermal conductivity is expressed in W/mK and is obtained by multiplying the thermal conductance per unit area with the thickness. It will be appreciated that although the thickness of the barrier may have any hypothetical value, in reality the thickness will be limited due to practical restraints such as weight or size of the mould. Typically, the thickness of the barrier will not exceed 0.1 m.

It is preferred that independent of the thickness of the barrier, the barrier has a thermal conductivity of at most 1 W/mK, more preferably in the range of from 0.01 to 1 W/mK, more preferably 0.01 to 0.5 W/mK, in a direction perpendicular to the inner surface.

When the barrier is in heat contact with a heat source such as a hot cast material, the temperature of the barrier may change. The temperature change is induced by the transport of heat between the barrier and the heat source. The amount of heat necessary to change the temperature of the barrier, i.e. the volumetric specific heat capacity per unit area of the barrier depends on the thermal properties of the material(s) of which the barrier is comprised and the thickness of the barrier in a direction perpendicular to the inner surface. Reference herein to the volumetric specific heat capacity per unit area is to the heat required to raise a unit area of substance by one degree of temperature. The volumetric specific heat capacity per unit area is expressed in J/m²K. Preferably, the volumetric specific heat capacity per unit area of the barrier is at least 1,000 J/m²K, more preferably at least 10,000 J/m², even more preferably in the range of from 10,000 to 10,000,000 J/m²K, in a direction perpendicular to the inner surface. The correlation between the volumetric specific heat capacity per unit area and the thickness of the barrier is given by the volumetric specific heat capacity in a direction perpendicular to the inner surface of the material(s) of which the barrier is comprised. Reference herein to the volumetric specific heat capacity is to the heat required to raise a unit volume of substance by one degree of temperature. The volumetric specific heat capacity is expressed in J/m³K and is obtained by dividing the volumetric specific heat capacity per unit area by the thickness.

It is preferred that independent of the thickness of the barrier, the barrier has a volumetric specific heat capacity of at least 10,000 J/m³K, more preferably at least 1,000,000 J/m³K, even more preferably in the range of from 1,000,000 to 100,000,000 J/m³K, in a direction perpendicular to the inner surface.

The advantage of a high specific heat capacity per unit area, preferably over 10,000 J/m²K, is that this may allow the barrier to absorb significant amounts of heat before the temperature of the barrier is significantly changed. Although, heat is constantly transported through the barrier, the barrier in fact may act as a temperature buffer. When, in addition, the specific heat capacity is over 1,000,000 J/m³K, this advantage, i.e. allowing the barrier to absorb significant amounts of heat before the temperature of the barrier is significantly changed, is obtained and in addition the required thickness of the barrier is kept to a minimum.

The mould may have any suitable shape known in the art, such as curved, cubical, spherical, cylindrical, triangular or an elongated derivative shape thereof. Typically, the mould may have an essentially cylindrical, cubical or elongated cubical shape. Examples of such shapes include a block with provided therein one or more inner volumes or any other support structure provided with one or more inner volumes. It will be appreciated that when two or more inner volumes are comprised in a single mould, the outer surface, i.e. the surface in contact with the outer atmosphere, may have a normal vector that is inclined in a plane perpendicular to the tangent plane of the inner surface.

The inner volume may have any shape that is known in the art. Typically, the shape of the inner volume may be determined by the desired shape of the cast material. Examples or such shapes include curved, cubical, spherical, triangular or an elongated derivative shape thereof. Such shapes may serve as tiles, bricks, building components or works of art.

The barrier may be comprised of one or more layers, whereby each layer may be comprised of the same or different materials. If there are two or more layers, such layers preferably extend in a direction parallel to the inner surface. Reference herein to a direction parallel to the inner surface is to a direction parallel to the tangent plane of the inner surface. It will be appreciated that if the inner surface is curved, the tangent plane may differ depending on the position on the inner surface. This has the advantage that a uniform thermal behaviour is obtained in the barrier in a direction perpendicular to the inner surface. Preferably, the barrier is comprised of two or more layers extending in a direction parallel to the inner surface. The use of more than one layer may provide a synergy effect. For instance a mechanically and thermally stable mould may be obtained by using mechanically strong outer layer combined with a thermally stable inner layer. Typically, each layer may be comprised of a material independently having a thermal conductivity and/or volumetric specific heat capacity. Depending on the thickness of each layer, each layer may independently have a thermal conductance per unit area or volumetric specific heat capacity per unit area. Preferably, the layer forming the inner surface has a thermal conductivity of at most 1 W/mK in a direction perpendicular to the inner surface. This prevents a high rate of heat transfer at the interface between the barrier and the inner volume.

Preferably, the inner surface, outer surface and barrier are comprised of one or more metals, polymeric materials, silicon comprising materials or combinations thereof, preferably polymeric materials, silicon comprising materials or combinations thereof, more preferably polymeric materials. The materials may be dense or porous, such as polymeric or inorganic foams. The materials may be homogeneous or heterogeneous composites. It will be appreciated that the choice of material forming the inner surface should be such that a good surface finish can be obtained. Polyurethanes were found to be unsuitable as the moulds prepared using polyurethane showed significant deterioration and decomposition of the mould due to melting and decomposition of the polyurethane. It is known that polyurethane may start to decompose at temperature between 120 to 180° C. Consequently, the moulds have a reduced lifetime and the surface finish of the prepared sulphur cement products may be affected.

Typically, metals have a thermal conductivity above 5 W/mK, more typically in the range of from 20 to 450 W/mK. For example aluminium has a thermal conductivity of 237 W/mK, copper 398 W/mK, iron 80.3 W/mK and titanium 21.9 W/mK. It will therefore be appreciated that the mould should preferably not consist predominately out of a metal. For instance, the use of an iron mould would require a barrier thickness of at least 0.8 m.

Polymers, however, typically have a thermal conductivity below 1 W/mK. Furthermore, polymers may have volumetric specific heat capacities, which are typically in the range of from 1,000,000 to 10,000,000 J/m³K. Therefore, a layer having a thickness of approximately 0.01 m of silicone rubber is sufficient to prepare a mould according to the invention. Approximate values for thermal conductivity and volumetric specific heat capacities of generally known polymers are:

| Material | Thermal conductivity (W/mK) | Volumetric specific heat capacity (J/m³K) |
| --- | --- | --- |
| PVC | 0.16 | 1,950,000 |
| PTFE | 0.25 | 2,200,000 |
| Polydimethylsiloxane | 0.86 | 2,704,000 |
| Polyethylene | 0.35 | 2,116,000 |
| Polystyrene | 0.035 | 39,000 |
| Polyurethane | 0.027 | 168,000 |
| Polyimide | 0.1 | 1,547,800 |
| Polymethylmethacrylate | 0.19 | 1,652,000 |
| Polyamide | 0.26 | 2,415,000 |
| Resol type Foam | 0.029 | 120,000 |
| Novolac type Foam | 0.024 | 30,144 |

It will be appreciated that depending on polymer properties such as monomer composition, chain length and the degree of cross-linking, the actual thermal properties of a particular polymer may deviate from the approximate values given hereinabove.

When the barrier is comprised out of two or more layers comprising different materials, it will be appreciated that the thermal conductance per unit area (U) of the total barrier may be determined following equation (1):

$$1/U = 1/U_1 + 1/U_2 + \ldots + 1/U_n \qquad (1)$$

Examples of barriers include barriers comprised of silicon rubber, polycarbonate, glass or combination thereof with sand. In the later example the rubber, polycarbonate or glass form the most inner layer and the sand and may form an outer insulating layer. Such can be obtained for instance by embedding the inner layer in an amount of sand.

The invention further provides a process for shaping a sulphur cement product. In the process according to the invention a molten sulphur cement product is cooled in a mould and the heat flow through the mould is controlled such that at most 100 W/m²K is diffused per unit area through the mould in a direction perpendicular to the inner surface.

Reference to a molten sulphur cement product is to a sulphur cement product comprising molten sulphur. Sulphur melts in a temperature in a range of from 115 to 130° C.

Preferably, the molten sulphur cement product has a temperature in the range of from 120 to 180° C., more preferably 120 to 145° C. At temperatures below this range the sulphur may not melt not melt or melt incompletely and the viscosity is to low and at higher, i.e. above 180° C., temperatures the sulphur has a tendency to polymerise, resulting in an undesired increased viscosity.

The cooling of the sulphur cement product is controlled by limiting the heat flow through the mould in a direction perpendicular to the inner surface. When the sulphur cement product is in contact with the inner surface of the mould at most 100 W/m²K is diffused through the mould in a direction perpendicular to the inner surface. Preferably, in the range of from 0.1 to 100 W/m²K, more preferably 0.1 to 60 W/m²K, even more preferably in the range of from 0.1 to 10 W/m²K, still more preferably of from 0.1 to 5 W/m²K is diffused through the mould in a direction perpendicular to the inner surface.

In the process according to the invention, a reduced temperature difference between the bulk of the sulphur cement product and the sulphur cement product contacting the inner surface may be obtained. This is in contrast to a process wherein more than 100 W/m²K is diffused through the mould, e.g. by using an iron or steel mould. The process according to invention may allow the bulk of the molten and the sulphur cement product contacting the inner surface to solidify approximately at the same time. As a consequence, the internal stress due to shrinkage induced by the solidification at the inner surface prior to the solidification of the bulk is reduced. It will be appreciated that these internal stresses play an important role in the formation of micro cracks and porosity on the surface of the solid sulphur cement product.

The mould may be any mould known in the art allowing at most 100 W/m²K to diffuse through the mould in a direction perpendicular to the inner surface. Preferably, a mould according to the invention is used.

The mould may be filled with a solid or a molten sulphur cement product. Preferably, the mould is filled with a molten sulphur cement product prior to cooling. It will be appreciated that when the mould is filled with a solid sulphur cement product, heat must be applied to the sulphur cement product to induce the sulphur to melt.

Preferably, when the mould is filled with molten sulphur cement product, the mould is heated or preheated to a temperature close to the temperature at which the sulphur cement product is molten, preferably to a temperature in the range of from 90 to 150° C., more preferably of from 100 to 140° C. Preferably, the mould is heated before the mould is filled with molten sulphur cement product. Especially, when a mould is used with a high volumetric specific heat capacity per unit area, i.e. of from 1,000 $J/m^2K$, more preferably for from 10,000 $J/m^2K$, even more preferably in the range of from 10,000 to 10,000,000 $J/m^2K$, in a direction perpendicular to the inner surface, the mould may act as a temperature buffer. When such a mould is preheated to a temperature in the range of the melt temperature of sulphur, premature solidification of the sulphur cement product at the inner surface of the mould may be prevented.

Preferably, the inner surface of the mould is comprised of a polymeric material, a silicon-based glass or a combination thereof. Such materials may allow for an easy release of the solid shaped sulphur cement product, without the use of release agents, such as form oil.

It will be appreciated that when the inner surface is comprised of a polymeric material, the polymeric material has a thermal decomposition temperature and/or melting temperature of at least 120° C., preferably of at least 200° C. Reference herein to melting temperature is to a temperature above which the viscosity of the polymer becomes so low that the structural integrity of the inner surface is compromised. It will be appreciated that some polymers do not melt as the polymer thermally decomposes prior to melting. Such polymers, however, may show a decrease in viscosity when reaching a temperature above their glass transition temperature the structural integrity of the inner surface may become compromised.

It will further be appreciated that the inner surface should not react chemically with the sulphur.

Preferably, the polymeric material is a silicon-based rubber, polycarbonate, poly(ethylene terephthalate), polyimide, polyamide, fluorpolymer or a combination thereof, preferably a silicon-based rubber. Silicon-based rubbers are well known in the art. Examples of silicon-based rubbers include polydimethylsiloxane (PDMS). More preferably, the mould is essentially in its entirety formed from a silicon-based rubber. The use of silicon-based rubber moulds may improve the release of solid sulphur cement products even further due to the flexible nature of silicon-based rubbers.

Polyurethanes were found to be unsuitable as the moulds prepared using polyurethane showed significant deterioration and decomposition of the mould due to melting and decomposition of the polyurethane. It is known that polyurethane may start to decompose at temperature between 120 to 180° C. Consequently, the moulds have a reduced lifetime and the surface finish of the prepared sulphur cement products may be affected.

The sulphur cement product may be any sulphur cement containing material, i.e. a material at least containing elemental sulphur and a filler. Examples of sulphur cement containing materials are sulphur cement premix compositions and sulphur cement-aggregate composites such as sulphur mortar, sulphur concrete or sulphur-extended asphalt.

Sulphur cement is known in the art and at least comprises sulphur, usually in an amount of at least 50 wt %, and a filler. Usual sulphur cement fillers are particulate inorganic materials with an average particle size in the range of from 0.1 µm to 0.1 mm. Examples of such sulphur cement fillers are fly ash, limestone, quartz, iron oxide, alumina, titania, graphite, gypsum, talc, mica or combinations thereof. The filler content of sulphur cement may vary widely, but is typically in the range of from 5 to 50 wt %, based on the total weight of the cement.

Sulphur cement may be plasticised by the addition of a sulphur cement modifier in the sulphur cement preparation process. Such modifiers are known in the art. Examples of such modifiers are aliphatic or aromatic polysulphides or compounds that form polysulphides upon reaction with sulphur. Examples of compounds that form polysulphides are olefinic compounds such as 5-ethylene-2-norbornene, dicyclopentadiene, limonene, styrene or naphthalene. Modifiers may be added in an amount in the range of from 0.05 to 25 wt % based on the weight of sulphur, usually in the range of from 0.1 to 10 wt %.

Reference herein to a sulphur cement premix composition is to a composition comprising a pre-reacted mixture of sulphur and a sulphur cement modifier that can suitably be used for the preparation of sulphur cement by adding sulphur and/or filler to it in the required amounts.

Reference herein to sulphur cement-aggregate composites is to a composite comprising both sulphur cement and aggregate. Examples of sulphur cement-aggregate composites are sulphur mortar, sulphur concrete and sulphur-extended asphalt. Mortar comprises fine aggregate, typically with particles having an average diameter between 0.1 and 5 mm, for example sand. Concrete comprises coarse aggregate, typically with particles having an average diameter between 5 and 40 mm, for example gravel or rock. Sulphur-extended asphalt is asphalt (typically aggregate with a binder containing filler and a residual hydrocarbon fraction), wherein part of the binder has been replaced by sulphur.

It has been found that the shaped solid sulphur cement products prepared by the process according to the invention show a good surface finish and exhibit reflectory properties. This enables the preparation of shaped sulphur cement products with a coloured glossy surface finish. A pigment may be applied on the inner surface of the mould prior to introducing the cast material into the inner volume. After the cast material is introduced, the pigment may subsequently be transferred to the surface of the sulphur cement product. After cooling, a coloured shaped solid sulphur cement product is obtained.

EXAMPLES

The following non-limiting experiments serve to illustrate the invention.

Experiment 1

A cast mixture was used comprising 25 wt % sulphur, 28 wt % quartz as filler and 47 wt % dried sand (Normsand) as aggregate. Both the quartz filler and the sand aggregate were preheated for 12 hours at 150° C. The cast mixture was prepared by mixing the molten sulphur with the sand aggregate. Subsequently, the quartz filler was mixed into the mixture.

A silicon rubber mould (mould 1) having properties as shown in table 1 was preheated to a temperature of approximately 100° C. for at least 12 hours. Bars of 40×40×160 mm were prepared by casting the molten cast mixture into the preheated mould and allowing the mould and cast mixture to cool to a temperature below 60° C. The sulphur cement bar could be removed from the mould without the need to apply excessive force due to the flexible nature of the silicon rubber mould.

The sulphur cement bar produced according to experiment 1 is shown in FIG. 1 as Sample 1. The produced sulphur cement bar had a very smooth surface finish.

Experiment 2

A sulphur cement product was produced following the method of experiment 1, with the exception that the silicon rubber mould was preheated to 55° C. Again, the sulphur cement bar could be removed from the silicon rubber mould without the need to apply excessive force due to the flexible nature of the silicon rubber mould.

The sulphur cement bar produced according to experiment 2 is shown in FIG. 1 as Sample 2. The produced sulphur cement bar had a smooth surface finish.

Comparative Experiment A

A sulphur cement product was produced following the method of experiment 1, with the exception that the silicon rubber mould was replaced by a stainless steel mould as described in NEN-EN-196 (mould A, see Table 1 for the mould properties).

After cooling the sulphur cement bar was removed from the mould by dismantling the mould.

The sulphur cement bar produced according to comparative experiment A is shown in FIG. 1 as Sample A. The produced sulphur cement bar had a very rough surface texture compared to the sulphur cement bars produced in experiments 1 and 2. Large deformations were visible on the surface of the sulphur cement bar.

Comparative Experiment B

A sulphur cement product was produced following the method of comparative experiment A, with the exception that the inner surface of the stainless steel mould was coated with a PTFE (polytetrafluorethylene) layer (mould B, see table 1 for the mould properties). The PTFE layer had a thickness of approximately 100 μm.

After cooling the bar was removed from the mould by dismantling the mould. It was visually observed that part of the PTFE layer was transferred from the mould to the sulphur cement bar. To repeat the experiment it was necessary to remove the remaining part of the PTFE layer and apply a new PTFE layer to the inner surface of the stainless steel mould.

The sulphur cement bar produced according to comparative experiment B is shown in FIG. 1 as Sample B. The produced sulphur cement bar had a rough surface texture compared to the sulphur cement bars produced in experiments 1 and 2.

TABLE 1

| Mould | thickness barrier [×$10^{-3}$ m] | thermal conductance per unit area [W/$m^2$K] | volumetric specific heat capacity per unit area [J/$m^2$K] |
| --- | --- | --- | --- |
| 1 | 15 | 57 | 27075 |
| A | 15 | 933 | 54510 |
| B* | 15.1 | 697 | 54730 |

*For the calculations a thickness of the PTFE coating of 1 × $10^{-4}$ m was used

What is claimed is:

1. A process for shaping a sulphur cement product to provide a shaped solid sulphur cement product, wherein the process comprises: filling a mould having an inner surface with a molten sulphur cement product; cooling the molten sulphur cement product at a controlled rate by limiting the heat flow to at most 100 W/$m^2$K of diffused heat through the mould in a direction perpendicular to the inner surface of the mould by contacting the molten sulphur cement product with the inner surface, which comprises a material of either a polymeric material selected from the group consisting of silicon-based rubber, polycarbonate, poly(ethylene terephthalate), polyimide, polyamide, fluoropolymer or a combination thereof, or a silicon-based glass, or a combination of the polymeric material and the silicon-based glass, and wherein the material has thermal properties providing for the controlled rate of cooling.

2. A process according to claim 1, wherein the controlled rate of heat flow is at most 60 W/$m^2$K.

3. Process according to claim 1, wherein the inner surface describes an inner volume for receiving a cast material, and wherein the mould has an outer surface and a barrier comprised between the inner surface and the outer surface, and wherein the barrier has a thermal conductivity of at most 1 W/mK in a direction perpendicular to the inner surface.

4. Process according to claim 3, wherein the barrier comprises two or more layers extending in a direction parallel to the inner surface.

5. Process according to claim 3, wherein the barrier further has a volumetric specific heat capacity per unit area of at least 10,000 J/$m^2$K in a direction perpendicular to the inner surface.

6. Process according to claim 5, wherein prior to filling the mould with the molten sulphur cement product, the mould is heated to a temperature in the range of from 90 to 150° C.

7. Process according to claim 1, wherein the polymeric material has a thermal decomposition temperature and/or melting temperature of at least 120° C.

8. Process according to claim 1, wherein the polymeric material is a silicon-based rubber.

9. Process according to claim 1, wherein the controlled rate of heat flow is in the range of from 0.1 to 10 W/$m^2$K.

10. Process according to claim 1, wherein the controlled rate of heat flow is in the range of from 0.1 to 5 W/$m^2$K diffused per unit area through the mould in a direction perpendicular to the inner surface.

11. Process according to claim 2, wherein the inner surface describes an inner volume for receiving a cast material, and wherein the mould has an outer surface and a barrier comprised between the inner surface and the outer surface, and wherein the barrier has a thermal conductivity of at most 1 W/mK in a direction perpendicular to the inner surface.

12. Process according to claim 9, wherein the inner surface describes an inner volume for receiving a cast material, and wherein the mould has an outer surface and a barrier comprised between the inner surface and the outer surface, and wherein the barrier has a thermal conductivity of at most 1 W/mK in a direction perpendicular to the inner surface.

13. Process according to claim 10, wherein the inner surface describes an inner volume for receiving a cast material, and wherein the mould has an outer surface and a barrier comprised between the inner surface and the outer surface, and wherein the barrier has a thermal conductivity of at most 1 W/mK in a direction perpendicular to the inner surface.

14. Process according to claim 1, wherein the inner surface describes an inner volume for receiving a cast material, and wherein the mould has an outer surface and a barrier comprised between the inner surface and the outer surface, and wherein the barrier has a thermal conductivity of at most 0.5 W/mK in a direction perpendicular to the inner surface.

15. Process according to claim 2, wherein the inner surface describes an inner volume for receiving a cast material, and wherein the mould has an outer surface and a barrier comprised between the inner surface and the outer surface, and wherein the barrier has a thermal conductivity of at most 0.5 W/mK in a direction perpendicular to the inner surface.

16. Process according to claim 9, wherein the inner surface describes an inner volume for receiving a cast material, and wherein the mould has an outer surface and a barrier comprised between the inner surface and the outer surface, and wherein the barrier has a thermal conductivity of at most 0.5 W/mK in a direction perpendicular to the inner surface.

17. Process according to claim 10, wherein the inner surface describes an inner volume for receiving a cast material, and wherein the mould has an outer surface and a barrier comprised between the inner surface and the outer surface, and wherein the barrier has a thermal conductivity of at most 0.5 W/mK in a direction perpendicular to the inner surface.

18. Process according to claim 11, wherein the barrier comprises two or more layers extending in a direction parallel to the inner surface.

19. Process according to claim 12, wherein the barrier comprises two or more layers extending in a direction parallel to the inner surface.

* * * * *